United States Patent [19]

Kubota et al.

[11] Patent Number: 4,500,761
[45] Date of Patent: Feb. 19, 1985

[54] FLUID RESERVOIR WITH FLUID-LEVEL SENSOR

[75] Inventors: Hitoshi Kubota, Minami-ashigara; Seiji Hamamatsu, Kawasaki; Teluo Yambe, Yokosuka; Toshiyuki Takahashi, Miura, all of Japan

[73] Assignees: Nissan Motor Company, Limited, Yokohama; Tokico Ltd., Kawasaki; Nippon Air Brake Co., Ltd., Kobe, all of Japan

[21] Appl. No.: 498,476

[22] Filed: May 26, 1983

[30] Foreign Application Priority Data

Jun. 1, 1982 [JP] Japan .................. 57-92103

[51] Int. Cl.$^3$ .............. H01H 35/18; G01F 1/00; G08B 29/00; G08B 21/00
[52] U.S. Cl. ................. 200/84 C; 200/84 R; 116/109; 116/110; 73/308; 340/515; 340/618; 340/623
[58] Field of Search ........... 200/84 C, 84 B; 340/59, 340/60, 52 B, 515, 612, 618, 623; 73/308, 313; 60/535; 116/70, 109, 110, 204; 210/499; 188/1.11

[56] References Cited

U.S. PATENT DOCUMENTS

| 743,091 | 11/1903 | Loop ..................... 210/499 |
| 2,202,403 | 5/1940 | Sandberg ................. 210/499 |
| 3,167,623 | 1/1965 | Kaleta .................... 200/84 C |
| 3,942,526 | 3/1976 | Wilder et al. ............ 116/110 |
| 3,947,813 | 5/1976 | Uemura et al. ............ 200/84 C |
| 4,037,193 | 7/1977 | Uemura ................... 200/84 C |

FOREIGN PATENT DOCUMENTS

| 2228303 | 1/1972 | Fed. Rep. of Germany ....... 73/308 |
| 7242236 | 5/1973 | Fed. Rep. of Germany . |
| 55-127230 | 9/1980 | Japan . |
| 55-168823 | 12/1980 | Japan . |
| 56-3425 | 1/1981 | Japan . |
| 2074676 | 11/1981 | United Kingdom . |

Primary Examiner—E. A. Goldberg
Assistant Examiner—Fred L. Kampe
Attorney, Agent, or Firm—Schwartz, Jeffery, Schwaab, Mack, Blumenthal & Koch

[57] ABSTRACT

A fluid reservoir with a fluid-level sensor includes a manual testing device consisting of two separate but cooperative rods. The fluid-level sensor consists of a float within the reservoir and a reed switch which is closed to cause a low fluid-level alarm when the float is lower than a predetermined level. The testing device serves to depress the float to below that level to ensure that the switch and the alarm are working. A first rod is supported by a filter mounted at the top of the reservoir. A second rod is supported by a flexible cover which fits over the top of the reservoir. The rods are coaxial and free to move downward far enough to push the float to below the above level. Having the two rods separable allows the cover to be removed easily without damaging the manual testing device.

5 Claims, 2 Drawing Figures

U.S. Patent  Feb. 19, 1985  4,500,761

FLUID RESERVOIR WITH FLUID-LEVEL SENSOR

BACKGROUND OF THE INVENTION

The present invention relates to a fluid reservoir with means for sensing the level of liquid within the reservoir, especially for use in master brake cylinders.

Many conventional brake fluid reservoirs have fluid-level sensors which include a magnet mounted on a float floating on the brake fluid within the reservoir. The magnetic force produced by the magnet acts on a reed switch which senses the position of the float, thereby sensing the amount of fluid present in the reservoir. Some reservoirs further include a check mechanism in which the float is pressed into the brake fluid against the buoyancy of the brake fluid to the position where the reed switch is actuated by the magnet mounted on the float in order to check whether the reed switch is exactly actuated. One conventional fluid level sensor is mounted as a unit on the lid of a fluid reservoir or in the reservoir body. However, this type of reservoir is relatively large and must include many components so that mass production of this reservoir is inefficient and relatively expensive. Recently, in order to improve the manufacturing efficiency by simplifying the configuration of reservoirs, the reed switch of the fluid level sensor has been installed at the bottom of the reservoir to sense a magnet mounted on the bottom of float. The check mechanism of the sensor includes a rod which is capable of pressing the float to the bottom of the reservoir through the reservoir lid and the filter. Since the rod is relatively long and extends through the filter mounted on the reservoir body from the lid, however, the rod is apt to be broken or bent when the lid is removed from or returned to the reservoir. Furthermore, in the case where the float and the filter abut, the filter is securely fixed to the reservoir body in order to prevent excess upward displacement of the filter due to the buoyancy of the float. Thus, the rod is even more likely to be damaged when the lid is moved.

SUMMARY OF THE INVENTION

It is an object of the present invention to provide a fluid reservoir equipped with a fluid-level sensor in which the check mechanism is free from breakage when the lid of the reservoir is removed from or returned to the reservoir body.

According to the present invention, there is provided a fluid reservoir which includes a fluid level sensor, a first rod, supported by the reservoir so as to be free to move and thus able to push the float down, and a second rod supported by the lid of the reservoir so as to be free to move vertically so as to be able to push the first rod down when the second rod itself is depressed.

DETAILED DESCRIPTION OF THE PREFERRED EMBODIMENTS

Figure 1:
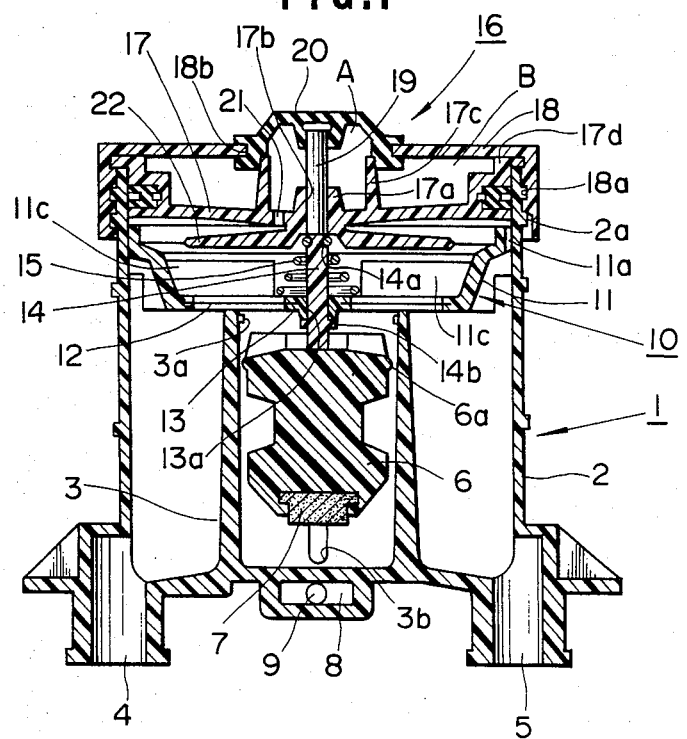
FIG. 1 is a cross-sectional view of a preferred embodiment of a fluid reservoir according to the present invention.
Figure 2:
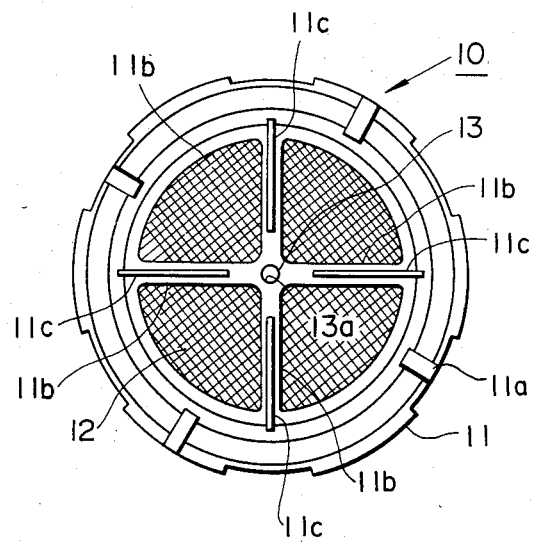
FIG. 2 is a plan view of the filter of FIG. 1.

Referring to FIGS. 1 and 2, there is shown a preferred embodiment of a fluid reservoir according to the present invention. The reservoir body 1 includes an outer, cylindrical, vertically oriented member 2 and an inner, cylindrical, vertically oriented member 3 closed at its bottom end, the bottom of inner member 3 being integral with the bottom of outer member 2. The bottom of outer member 2 has two ports 4 and 5 which communicate with a tandem master brake cylinder. Inner member 3 has a slit 3b through which the liquid is capable of passing between the inner and outer members. Inner member 3 accommodates a float 6 which is free to move up and down and which has a permanent magnet 7 mounted on its underside. Inner member 3 has a projection 3a on its inner surface which serves to limit the upward movement of float 6 by abutting a projection 6a formed on the upper portion of float 6. The sizes of projections 3a and 6a are designed such that, on assembly, float 6 is capable of being pressed into inner member 3 by means of resilient deformation. Below the bottom of inner member 3 is a cavity 8 within which is disposed a reed switch 9 actuated by magnetic force. Reed switch 9 is connected via leads to an alarm, not shown. A filter 10 is provided to remove foreign matter from the working liquid poured into the reservoir body. Filter 10 includes a support frame 11 fitted within outer member 2, a net 12 covering the upper end of inner member 3, and a guide 13 positioned at the center of net 12. Support frame 11 has a groove 11a at one point along its edge for venting air when the working liquid is supplemented. Filter 10 has four elongated reinforcement members 11b extending radially and symmetrically from, and integrally with, guide 13, and four rims 11c extending radially, one on each reinforcement member 11b.

Inserted through a hole 13a in guide 13 is a first rod 14 with an annular groove 14a near its upper end. The upper end of a helical spring 15 is received in the groove 14a and the lower end thereof is supported by the inner edges of rims 11c so as to urge first rod 14 upward. Rod 14 has a flange 14b near its lower end which abuts the underside of guide 13, thereby limitting the upward movement of first rod 14.

A lid 16 includes an inner lid portion 17 and an outer lid portion 18, the edge of the former being inserted fixedly in a groove in the latter. Lid 16 engages the upper end of reservoir body 1 by means of male threads 2a on the upper outside portion of outer member 2 and female threads 18a on the inner wall of outer lid 18. A guide 17a provided at the center of inner lid 17 has a through hole 17b through which a second rod 19 is slidably inserted, the lower end of which abuts the upper end of first rod 14. An upper flanged end of second rod 19 is securely received in a rubber cover 20 which covers a central hole 18b in the top face of the outer lid portion 18. Inner lid portion 17 has a hole 21 through which the inner space of lid 16 communicates with the inner space of reservoir body 1. The bottom of inner lid portion 17 has a baffle 22 which hinders flow of the working liquid from reservoir body 1 into the inner space of lid 16 via hole 21. A groove-like passage, not shown, is provided where outer and inner lid portions 18 and 17 meet, in order that the inner space of reservoir body 1 may vent to the outside of the reservoir via the inner space of lid 16. The chamber A defined by cover 20, guide 17a and inner cylindrical partition 17c of inner lid portion 17 communicates with the chamber B defined by outer lid portion 18, cylindrical portion 17c, the bottom of inner lid portion 17, and an outer cylindrical wall 17d of inner lid portion 17 through a port, not shown, which is provided where cylindrical portion 17c and cover 20 engage, in order that the air can easily move from chamber A to chamber B so that cover 20 can easily be pressed downward.

The operation of the reservoir will be described. When reservoir body 1 contains a sufficient quantity of working fluid, float 6 rises due to its buoyancy in the working liquid to the position where it abuts first rod 14 so that reed switch 9 is not actuated. As the amount of the working liquid decreases so that its level within the reservoir 1 drops, float 6 drops accordingly. When float 6 drops to a predetermined level, permanent magnet 7 magnetically actuates reed switch 9 which in turn actuates an alarm, not shown, to indicate that the reservoir does not hold a sufficient amount of working liquid. In order to test reed switch 9 while a sufficient amount of working liquid is present within reservoir body 1, cover 20 may be pushed from above to cause second and first rods 19 and 14 to push float 6 to the bottom of reservoir body 1. If neither reed switch 9 nor the alarm malfunction at that time, actuation of reed switch 9 will cause the alarm to produce an alarm. If one or the other malfunctions, the alarm will not operate so that the failure thereof can be recognized. When the cover 20 is released after the operation of reed switch 9 and the alarm have been tested, the buoyancy of float 6 and the resiliency of spring 15 move the associated members upwards to their original positions, as shown. When lid 16 is removed from reservoir body 1 in order to add more working liquid, no undue force or flexion will be applied to first and second rods 14 and 19 because first and second rods 14 and 19 are separate members. After lid 16 is removed, second rod 19 is supported by the resiliency of cover 20 so as not to be displaced significantly relative to lid 16. First rod 14, held in the position shown by spring 15, remains in outer member 2 along with filter 10. Obviously, if working liquid is supplemented in this situation, the reservoir can be filled with fluid to a predetermined level without letting foreign substances enter outer member 2.

While a preferred embodiment of the present invention has been described, it should be noted that the present invention should not be limited to the embodiment. Various changes and modifications of the present invention could be made by those skilled in the art without departing from the scope of the present invention set forth in the attached claims.

What is claimed is:

1. A fluid reservoir, comprising:
   (a) a fluid retainer having an upper opening for retaining a supply of a working fluid, the quantity of said working fluid being indicated by the vertical level of said working fluid within the retainer;
   (b) a float free to move vertically within the retainer and of a lower density than the working fluid;
   (c) a fluid-level sensor disposed at the bottom of said retainer and sensitive to the vertical position of the float for causing a low fluid-level alarm when the float is lower than a predetermined level;
   (d) a cover for removably covering the upper opening of the retainer;
   (e) a first rod supported by the retainer so as to be free to move vertically between a first position permitting free vertical movement of the float and a second position causing the float to be lower than said predetermined level; and
   (f) a second rod supported by and contained within the cover so as to be vertically movable manually from a third position permitting the first rod to assume the first position and a fourth position causing the first rod to assume the second position.

2. A fluid reservoir according to claim 1, including a filter covering the upper opening of said retainer for filtering foreign matter from working fluid entering the retainer through the upper opening, and means for resiliently biasing said first rod upwards in said filter such that said first rod is movable through said filter.

3. A fluid reservoir according to claim 2, wherein said biasing means includes a helical spring disposed around said first rod, said helical spring having one end held by the upper end of said first rod and the other end held by said filter, and said first rod including a stop for stopping its upward movement past a predetermined limit.

4. A fluid reservoir according to claim 3, wherein said float is capable of abutting the lower end of said first rod.

5. A fluid reservoir comprising:
   (a) a reservoir body including:
      (i) an outer cylindrical container for containing a working fluid and having an upper opening, the bottom of said container having a port through which the inside of said outer container is in fluid communication with a device which uses but does not consume the working fluid; and
      (ii) an inner cylindrical container for containing a working fluid, said inner container having an upper opening, and being disposed coaxially within said outer container, said inner container having a port through which the inside of said inner container is in fluid communication with the outside of said inner container,
   (b) a float disposed within said inner container and of a lower density than said fluid,
   (c) a magnet fixed to the underside of said float,
   (d) a reed switch disposed at the bottom of said inner container,
   (e) a filter covering the respective upper openings of said outer and inner cylindrical containers for filtering foreign matter from working fluid poured through the respective upper openings into the outer and inner cylindrical containers,
   (f) a lid removably closing the respective upper openings of said outer and inner cylindrical containers,
   (g) a first vertical rod, the lower end of which is capable of abutting the upper end of said float, said first rod being supported by said filter so as to be movable vertically, and
   (h) a second vertical rod, the lower end of which is in axial translation-transmitting relationship with the upper end of said first rod, said second rod being supported by said lid so as to be movable vertically, thereby being capable of moving said first rod downward when moved downward.

* * * * *